United States Patent
Oshiro et al.

(10) Patent No.: US 7,249,499 B2
(45) Date of Patent: Jul. 31, 2007

(54) VELOCITY SENSITIVITY CORRECTION METHOD OF REDUCED PRESSURE JUDGING VALUE IN TIRE PRESSURE DROP ALARMING DEVICE

(75) Inventors: Yuji Oshiro, Kobe (JP); Kazuyoshi Miyamoto, Kobe (JP)

(73) Assignee: Sumitomo Rubber Industries, Ltd, Kobe-shi (JP)

( * ) Notice: Subject to any disclaimer, the term of this patent is extended or adjusted under 35 U.S.C. 154(b) by 0 days.

(21) Appl. No.: 11/144,663

(22) Filed: Jun. 6, 2005

(65) Prior Publication Data

US 2005/0274177 A1     Dec. 15, 2005

(30) Foreign Application Priority Data

Jun. 15, 2004   (JP)   .............................. 2004-176646

(51) Int. Cl.
    G01M 17/02   (2006.01)
(52) U.S. Cl. ......................................... 73/146; 152/416
(58) Field of Classification Search ................... 73/146; 152/416, 417; 137/224
    See application file for complete search history.

(56) References Cited

U.S. PATENT DOCUMENTS

| | | | | |
|---|---|---|---|---|
| 4,015,623 A | * | 4/1977 | Wanstreet | 137/224 |
| 4,470,506 A | * | 9/1984 | Goodell et al. | 206/223 |
| 4,678,017 A | * | 7/1987 | Schultz | 152/416 |
| 4,744,399 A | * | 5/1988 | Magnuson et al. | 152/417 |
| 4,782,878 A | * | 11/1988 | Mittal | 152/417 |
| 4,850,402 A | * | 7/1989 | Cunningham et al. | 141/38 |

FOREIGN PATENT DOCUMENTS

| | | |
|---|---|---|
| DE | 101 52 590 A1 | 10/2002 |
| EA | 1 284 205 A2 | 2/2003 |
| EA | 1 352 765 A2 | 10/2003 |
| EP | 0 646 481 A1 | 4/1995 |
| EP | 1 127 720 A2 | 8/2001 |
| EP | 1 332 895 A1 | 8/2003 |
| JP | 6-297923 A | 10/1994 |
| JP | 9-203678 A | 8/1997 |

* cited by examiner

*Primary Examiner*—Andre J. Allen
(74) *Attorney, Agent, or Firm*—Birch, Stewart, Kolasch & Birch, LLP (57) ABSTRACT

A tire deflation warning system, including a device for detecting a rotational velocity of a wheel attached to a vehicle and a device for judging a tire pneumatic pressure drop by determining a reduced pressure judging value that judges the tire pneumatic pressure drop made of difference of rotational velocity sum of two pairs of the wheels which are diagonally disposed in the vehicle, correcting the reduced pressure judging value by multiplying a weight coefficient that continuously varies according to the velocity of the vehicle, and comparing the corrected reduced pressure judging value with a threshold value, wherein it is tentatively judged whether or not there is a reduced pressure wheel; and in the case when it is tentatively judged that a driving wheel is being reduced pressure, the reduced pressure judging value is multiplied by the weight coefficient which is larger than in the case when it is tentatively judged that a driven wheel is being reduced pressure.

7 Claims, 11 Drawing Sheets

VELOCITY SENSITIVITY CORRECTION METHOD OF REDUCED PRESSURE JUDGING VALUE IN TIRE PRESSURE DROP ALARMING DEVICE

BACKGROUND OF THE INVENTION

The present invention relates to a device for detecting a pneumatic pressure drop of each of tires provided for a four-wheel vehicle and, more particularly, to a tire deflation warning system for more reliably judging a tire pneumatic pressure drop in both cases when a driving wheel is being reduced pressure and a driven wheel is being reduced pressure.

Conventionally, there has been practically used a method that detects whether or not a pneumatic pressure of a tire is dropped by using rotational velocity of a wheel provided for a vehicle. A tire pressure abnormal alarming method which informs of a pneumatic pressure drop of a tire provided for a vehicle judges by relative comparison of four-wheel rotational velocities.

Since reduced pressure wheel becomes fast in rotational velocity, in a tire deflation warning system (DWS), a reduced pressure judging value (DEL value) uses an equation, $$DEL=(Vfl+Vrr-Vfr-Vrl)/V\text{mean} \times 50$$

where Vfr is rotational velocity of a front right tire (a dynamic load radius×rotational angular velocity, same as above hereinafter), Vfl is rotational velocity of a front left tire, Vrr is rotational velocity of a rear right tire, and Vrl is rotational velocity of a rear left tire. By using this, it can be seen that a certain wheel is being reduced pressure from that the DEL value (an absolute value thereof becomes large from zero when a certain position is being reduced pressure. In the DWS, an alarm is set to activate, assuming that it is a reduced pressure state when the DEL value exceeds a specified value (for example, 0.13). The specified value is called as a reduced pressure judging threshold value.

On the other hand, even in the same state as the reduced pressure state by 30%, when the case at 50 km/h is compared with the case at 100 km/h, a tire radius at 100 km/h becomes larger by centrifugal force and the difference in the rotational velocity between a reduced pressure wheel and a normal pressure wheel will become small, resulting in a phenomenon that a DEL value in the case at 100 km/h becomes small with respect to a DEL value in the case at 50 km/h and come close to a DEL value at a normal state. For example, when the front wheel is being reduced pressure by 30%, the DEL value at 50 km/h becomes DEL=0.15, whereas the DEL value at 100 km/h becomes DEL=0.1.

In the DWS, since the threshold value (for example, 0.13) at which alarms is set to constant with respect to the velocity, a variable coefficient (a weight coefficient being velocity function, refer to FIG. 8) with respect to the velocity to the DEL value is multiplied so as to correct a drop of the DEL value at high speed when there is a reduced pressure wheel and to compare with the reduced pressure judging threshold value which is constant with respect to the velocity, and thus judges whether or not it is a reduced pressure state.

Figure 9:
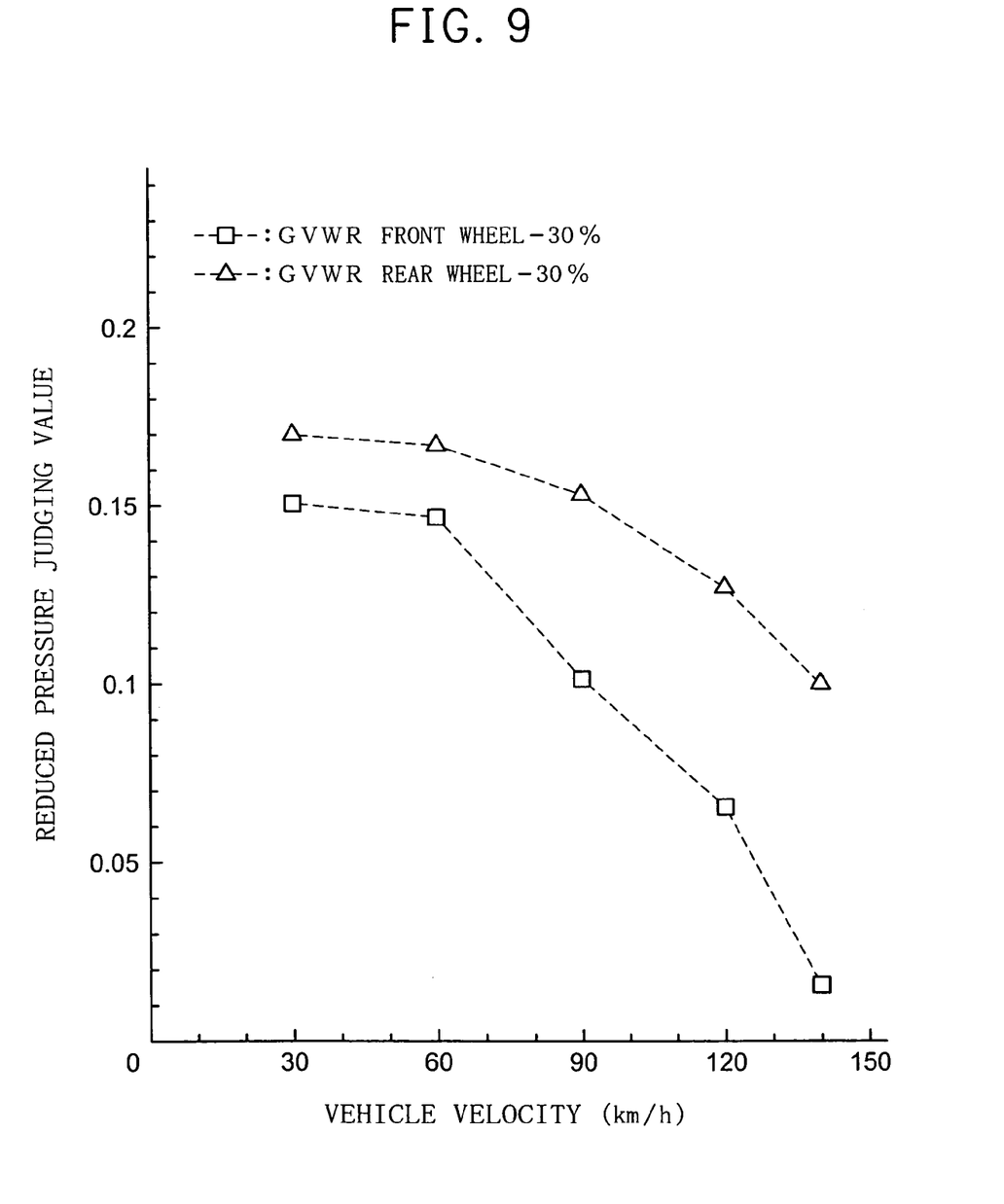
FIG. 9 is a diagram showing a reduced pressure judging value of a driving wheel reduced pressure and driven wheel reduced pressure with no velocity correction.

As shown in FIG. 9 (A vehicle BUICK RENDEZVOUS CVL, whose front wheels are driving wheels and rear wheels are driven wheels), since the rotational velocity of the reduced pressure wheel becomes fast, the DEL value is not zero, but becomes large, for example, 0.15. When traveling at high speed, the tire radius of the reduced pressure tire becomes large by the influence of the centrifugal force, and consequently the difference in the rotational velocities between the reduced pressure tire and the normal pressure tire becomes small to come close to zero (refer to FIG. 9, the range from 90 km/h to 140 km/h).

This influence becomes larger in the case when the driving wheel, to which a driving torque is applied, is being reduced pressure than in the case of the driven wheel, and as a result, the DEL value is rapidly dropped (from 90 km/h to 140 km/h of FIG. 9). This decrease is referred to as "an acute drop of a remarkable DEL value produced at high speed of the driving wheel reduced pressure or a value of similar equation".

Figure 8:
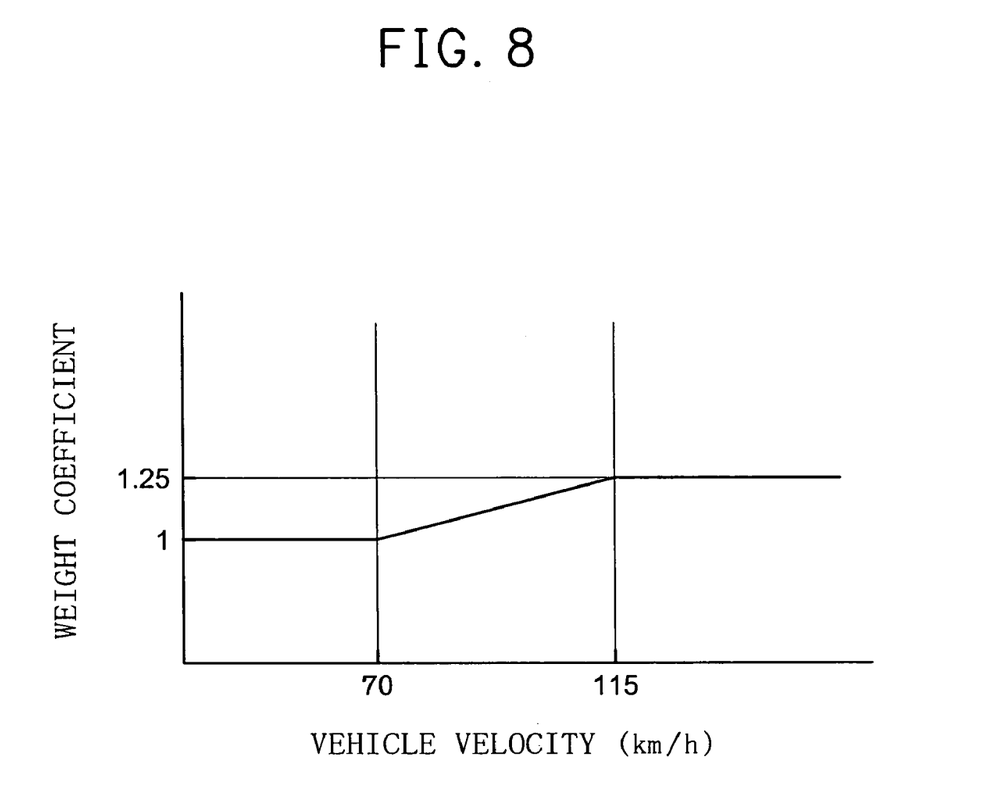
FIG. 8 is a diagram showing a conventional example of a weight coefficient according to velocity.

Consequently, a tire pressure drop detecting method which corrects a reduced pressure judging value by a weight coefficient according to a velocity and corrects reduction in reduced pressure sensitivity at high speed, has been known. For example, as shown in FIG. 8, the reduced pressure judging value is weighed by the weight coefficient according to the velocity (multiply the DEL value by the weight coefficient) and corrects reduction in DEL value, thereby enabling judgment at high speed.

Other techniques have been known, for example, a method for detecting pneumatic pressure by selecting or weighing either one of judged results, according to a vehicle traveling state including a road surface state, i.e., a judged result of pneumatic pressure based on a resonance frequency or a judged result of pneumatic pressure according to comparison of a rotational velocity element of a plurality of tires (refer to Japanese Unexamined Patent Publication No. 297923/1994); a method for correcting a reduced pressure judging value by a weight coefficient according to a vehicle velocity in addition to judging a pneumatic pressure drop according to the range of front/rear accelerations of a vehicle (refer to Japanese Unexamined Patent Publication No. 203678/1997); a method for correcting a tire pressure drop judging value according to a vehicle velocity (refer to Japanese Patent No. 3135437 and Japanese Patent No. 347516); and a method for correcting a rotational angular velocity by a ratio between a previously determined driving wheel and driven wheel according to a tire rotational angular velocity (refer to Japanese Unexamined Patent Publication No. 137512/1995).

SUMMARY OF THE INVENTION

A drop of the DEL value at high speed when a driving wheel is being reduced pressure, as aforementioned, may result in decreasing rate larger than a drop of the DEL value at high speed when a driven wheel is being reduced pressure (Refer to FIG. 9. A vehicle, BUICK RENDEZVOUS CXL, whose front wheels are driving wheels and rear wheels are driven wheels).

Figure 10:
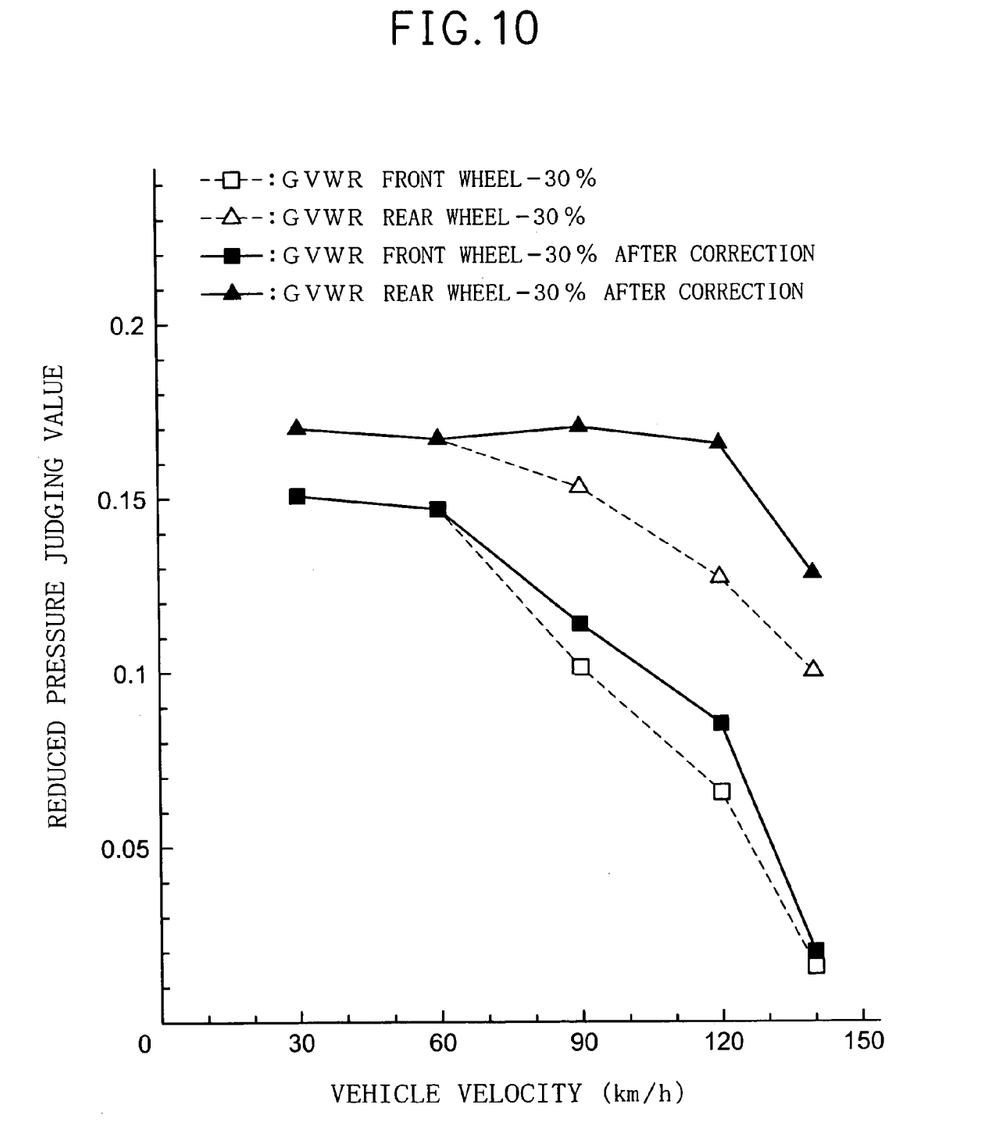
FIG. 10 is a diagram showing a conventional reduced pressure judging value in the case that velocity correction is performed according to a driven wheel, when the driving wheel is being reduced pressure and when a driven wheel is being reduced pressure.

In such a case, when velocity sensitivity correction is performed so as to match for a decreasing rate of a reduced pressure judging value in the case that the driven wheel is being reduced pressure, (that is, when a small weight coefficient is multiplied), it becomes impossible to alarm a driving wheel reduced pressure when traveling at high speed, because the judged value is small when the driving wheel is being reduced pressure (Refer to FIG. 10. A normal alarm threshold value is 0.13 and a driving wheel alarming threshold value is 0.09). On the contrary, when velocity sensitivity correction is performed so as to match for a large decreasing rate of a reduced pressure judging value in the case that the driving wheel is being reduced pressure, (that is, when a large weight coefficient is multiplied), when considered based on the premise of alarming by 30% reduced pressure, for example, it may occur an erroneous alarm as a result of coming close to an alarm threshold value, because the DEL value after correction becomes a high value even in the case that the driven wheel is being reduced pressure by 10% (Refer to FIG. 11).

An object of the present invention is to provide a tire deflation warning system and a tire deflation judging method which reliably judges reduced pressure in both cases that a driving wheel is being reduced pressure or a driven wheel is being reduced pressure, and does not judge by mistake that both cases are being reduced pressure when a vehicle is running at high speed.

A tire deflation warning system according to the present invention includes means for detecting a rotational velocity of a wheel attached to a vehicle; and means for judging a tire pneumatic pressure drop by determining a reduced pressure judging value that judges the tire pneumatic pressure drop made of difference of rotational velocity sum of two pairs of the wheels which are diagonally disposed in the vehicle, correcting the reduced pressure judging value by multiplying a weight coefficient that continuously varies according to the velocity of the vehicle, and comparing the corrected reduced pressure judging value with a threshold value, wherein it is tentatively judged whether or not there is a reduced pressure wheel; and in the case when it is tentatively judged that a driving wheel is being reduced pressure, the reduced pressure judging value is multiplied by the weight coefficient which is larger than in the case when it is tentatively judged that a driven wheel is being reduced pressure.

Another pressure drop alarming device according to the present invention is that a reduced pressure judging threshold value of the driving wheel in the case when it is tentatively judged that the driving wheel is being reduced pressure, is smaller than a reduced pressure judging threshold value of the driven wheel in the case when it is tentatively judged that the driven wheel is being reduced pressure.

According to the present invention, in the case that the driving wheel is being reduced pressure, it becomes possible to alarm a reduced pressure state when traveling at high speed. Further, according to the present invention, as when traveling at high speed in a state that reduced pressure of the driven wheel is small, a rise in DEL value is suppressed after velocity sensitivity correction in a state that a pneumatic pressure drop of a tire should not be alarmed and an erroneous alarm is avoided, whereby accuracy of alarm of the pneumatic pressure drop of the tire can be improved.

DETAILED DESCRIPTION

EMBODIMENT

Figure 2:
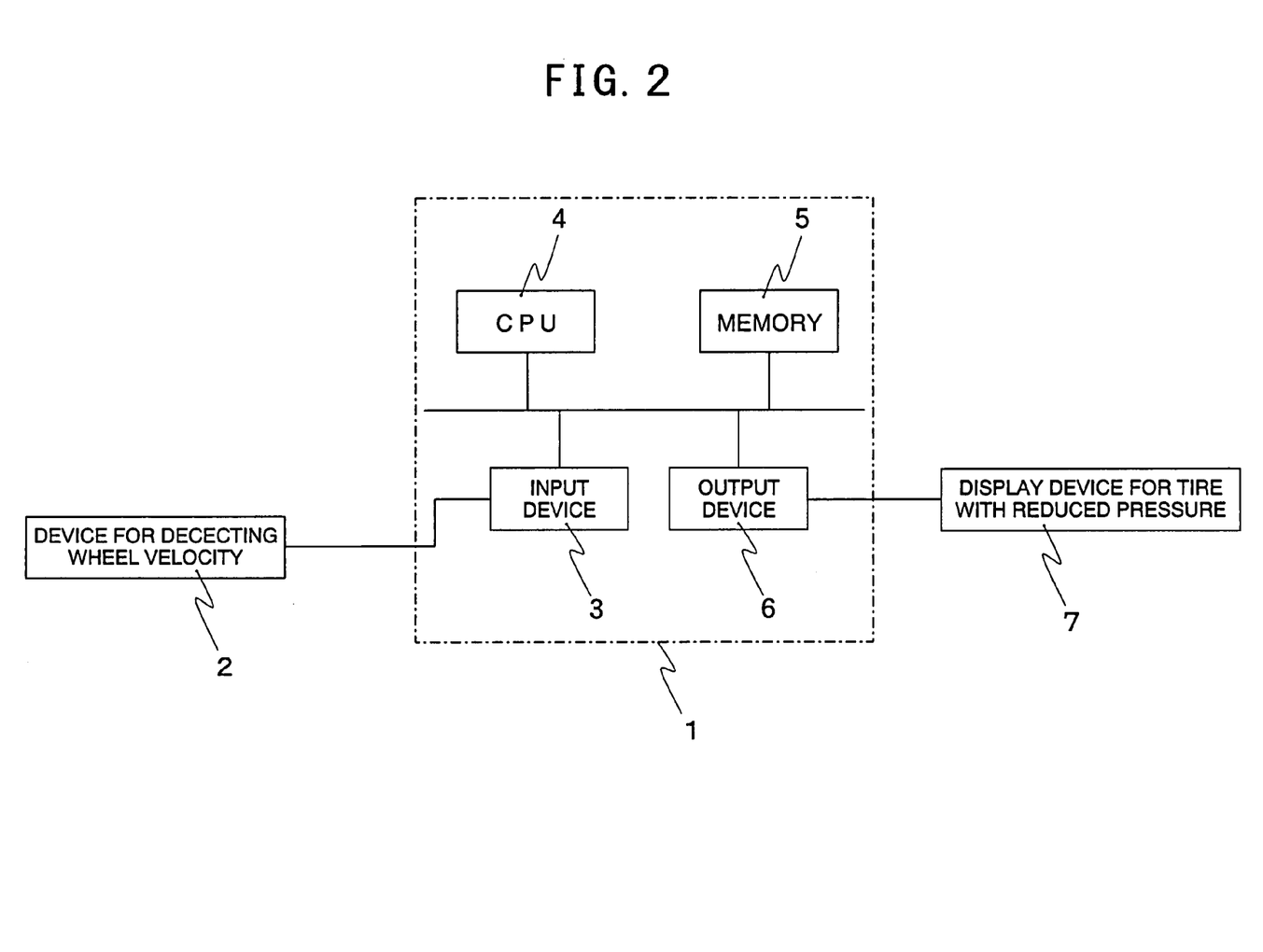
FIG. 2 is a block diagram showing a device configuration of the embodiment according to the present invention.

A tire deflation warning system according to the present invention will be exemplified and described with reference to FIG. 2.

The tire deflation warning system 1 of the present Embodiment is connected to means 2 for detecting rotational velocities of respective wheels and is connected to a tire pressure drop alarming indicator. The tire deflation warning system 1 includes a computing unit, a memory for storing programs and computing data, an input device for inputting wheel rotational velocity from wheel rotational velocity detecting means, and an output device for outputting an alarm to the tire pressure drop alarming indicator. A vehicle velocity may be detected and inputted in addition to the wheel rotational velocity. Further a tire pressure drop alarm may be outputted to other vehicle control device.

In the present Embodiment, a tire pressure drop judging program and data are stored in the same memory, but the tire pressure drop judging program may be stored in a ROM (read-only memory) and data may be stored in a RAM (random access memory).

Figure 1:
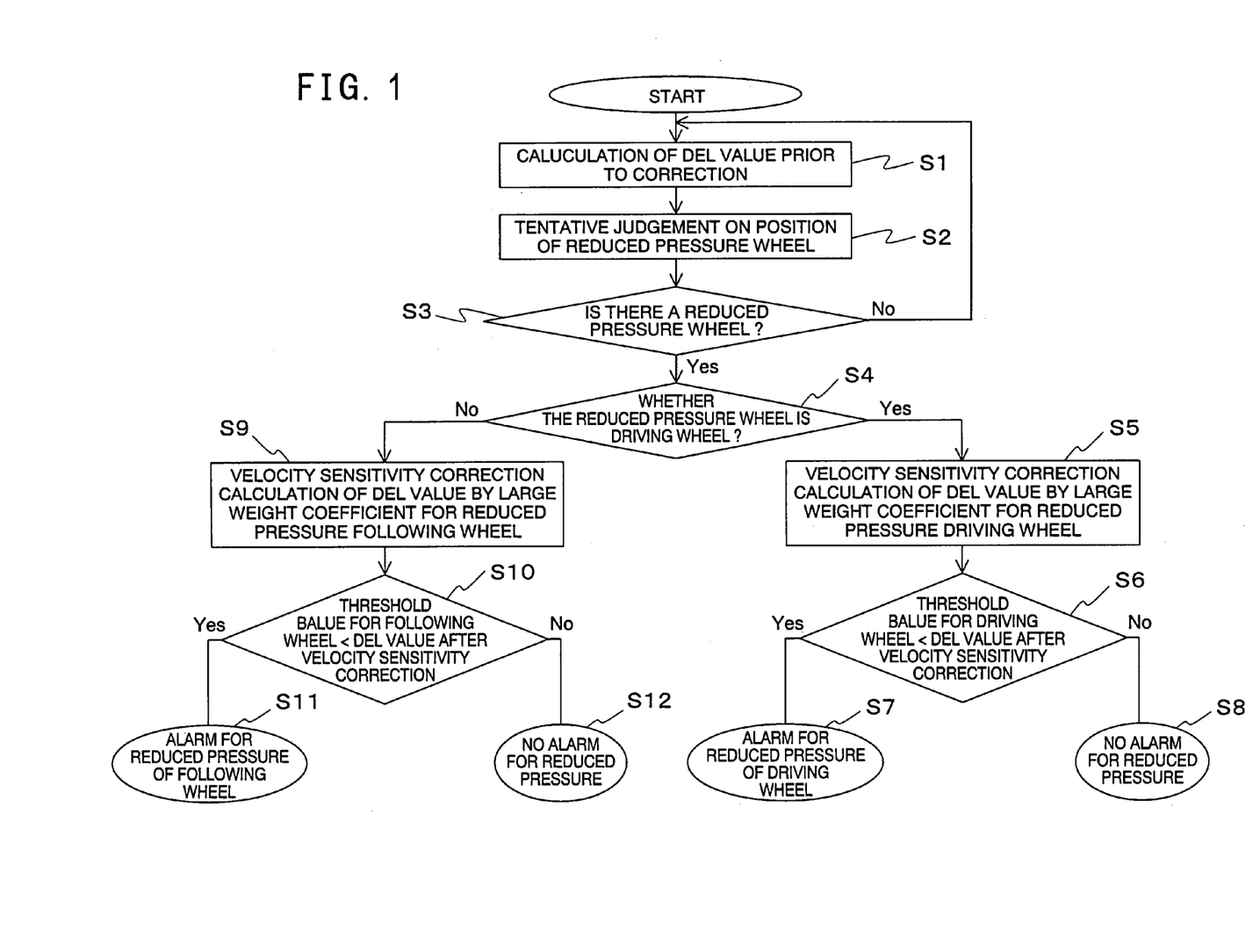
FIG. 1 is a flow chart showing a tire reduced pressure judgment of an embodiment according to the present invention.

An operation will now be described with reference to FIG. 1.

In step S1, a data input command is outputted to the input device, wheel rotational velocity information is taken into the memory, and a reduced pressure judging value (DEL value) is calculated. The DEL value uses the following values, for example. Vfr is as a rotational velocity (a dynamic load radius×rotational angular velocity, same as above hereinafter) of a front wheel right tire, Vfl is as a rotational velocity of a front wheel left tire, Vrr is as a rotational velocity of a rear wheel right tire, and Vrl is as a rotational velocity of a rear wheel left tire, and uses $$DEL = (Vfl + Vrr - Vfr - Vrl)/Vmean \times 50$$

where Vmean is the mean of four wheel rotational velocities. As a reduced pressure judging value, the aforementioned formula may be changed or formula with different coefficients may be used.

Next, in step S2, tentative judgment is performed whether or not there is a reduced pressure tire. For example, a position of the tire where pneumatic pressure is dropped is set as a judging logic, and the tentative judgment is performed by comparing a difference between 1 and a rotational velocity ratio of the right and left wheels of respective front and rear wheels with a threshold value. In the tentative judgment on the tire position that pneumatic pressure is dropped, the following equations can be used.

$$Rf = 1 - Vfr/Vfl$$

$$Rr = 1 - Vrr/Vrl$$

$$Rfrlp = Rf - Rr$$

The above-mentioned three equations are defined. For example, in the case that the above-defined three values are provided in the following, it can be judged that the front wheel left tire may be being reduced pressure.

an absolute value of Rfrlp>a threshold value of Rfrlp
Rf>a threshold value of Rf
an absolute value of Rr<a threshold value of Rr Similarly, the case that it is judged the front wheel right tire may be deflated is as follows:

an absolute value of Rfrlp>a threshold value of Rfrlp
Rf<−1×a threshold value of Rf
an absolute value of Rr<a threshold value of Rr The above-mentioned three threshold values, for example, when −30% is prescribed as a reduced pressure state, are determined so that they can be certainly judged within the range of velocities that can judge with reference to three values Rf, Rr, and Rfrlp in respective states of the front wheel −30% and rear wheel −30%. In this Embodiment, since a correct reduced pressure judgment is performed afterward, in the tentative judgment of step S2, it may be expected that reduced pressure may be broadly conducted (the tentative judgment may not be strictly conducted).

When it is tentatively judged that there is not a reduced pressure tire, the operation is repeated from step S1 (step S3); and when it is tentatively judged that there is a reduced pressure tire, the operation is divided according to the reduced pressure tire whether it is a driving wheel or a driven wheel (step S4).

Figure 3:
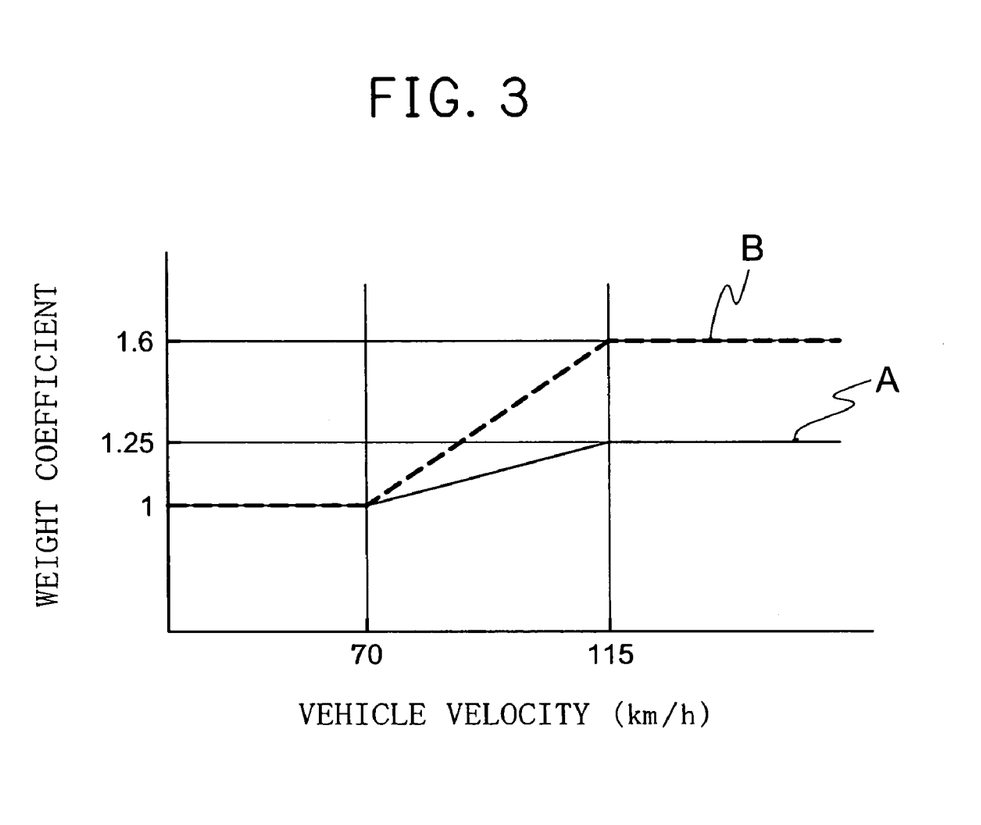
FIG. 3 is a diagram showing an example of the present invention in which a weight coefficient is changed according to a driving wheel and a driven wheel.

When it is tentatively judged that a reduced pressure wheel is a driving wheel, the DEL value is corrected by being multiplied with a large weight coefficient provided for driving wheel reduced pressure according to a velocity at that time. For example, a weight coefficient according to a velocity shown by the line B of FIG. 3 is multiplied to the DEL value determined in step S1.

Then, the corrected DEL value is compared with a threshold value for judging a wheel with reduced pressure (step S6). The threshold value for judging the wheel with reduced pressure is generally set to be smaller than a threshold value provided for driven wheel reduced pressure (for example, to be 0.09). As described in the background art, it is because that the difference of the rotational velocity between the tire with reduced pressure and the tire with normal becomes smaller when the driving wheel is being reduced pressure.

When the corrected DEL value is larger than the threshold value for judging the wheel with reduced pressure, it is alarmed that the driving wheel is being reduced pressure (step S7). When the corrected DEL value is not more than the threshold value for judging the wheel with reduced pressure, a reduced pressure alarm is not performed (step S8).

In step S4, when it is tentatively judged that a reduced pressure wheel is a driven wheel, the DEL value is corrected by being multiplied with a small weight coefficient for driven wheel reduced pressure according to a velocity at that time. For example, a weight coefficient according to a velocity shown by the line A of FIG. 3 is multiplied to the DEL value determined in step S1 (step S9).

Then, the corrected DEL value is compared with a threshold value for driven wheel reduced pressure judgment (step S10). The threshold value for judging a driven wheel with reduced pressure is generally set to be larger than a threshold value for judging the wheel with reduced pressure (for example, to be 0.13). When the corrected DEL value is larger than the threshold value for judging the driven wheel with reduced pressure, it is alarmed that the driven wheel is being reduced pressure (step S11). When the corrected DEL value is not more than the threshold value for judging the driven wheel with reduced pressure, a reduced pressure alarm is not performed (step S12).

Figure 4:
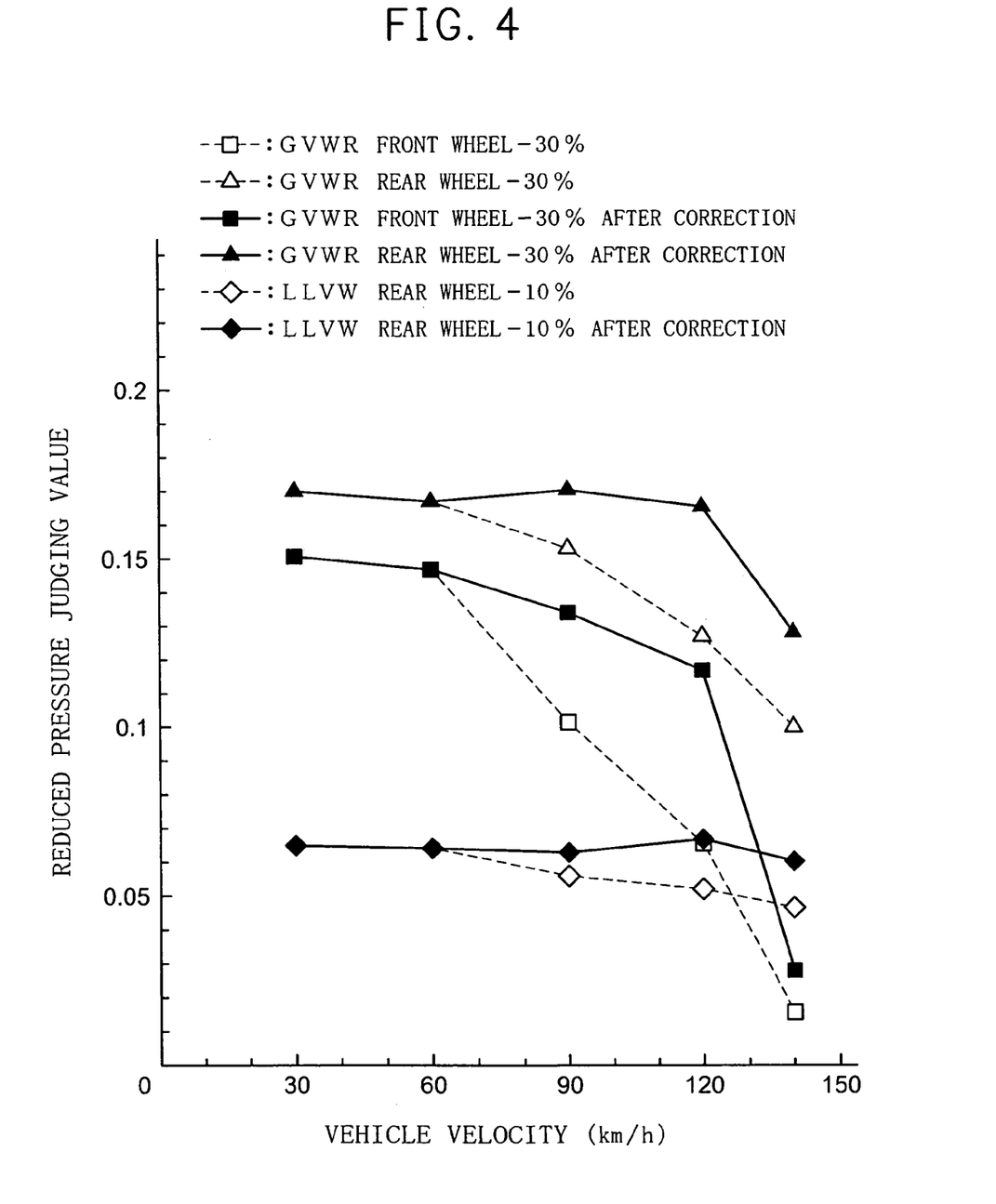
FIG. 4 is a diagram showing judged values with velocity sensitivity corrected by the weight coefficient of FIG. 3.

FIG. 4 is a graph showing the relationship between the DEL value before correction when the driving wheel (front wheel) is being reduced pressure by 30% and when the driven wheel (rear wheel) is being reduced pressure by 30% or 10%, and the value weighed by using a weight coefficient shown in FIG. 3.

When comparing FIG. 10 with FIG. 4, in the case that the driving wheel (front wheel) is being reduced pressure by 30% with a vehicle velocity being at high speed (approximately 90 km/h or above) and a reduced pressure judging threshold value of a driving wheel being as 0.09, a reduced pressure judging value after correction is close to or below the reduced pressure judging threshold value at the same weight coefficient as that of a driven wheel in FIG. 10; whereas in FIG. 4, because of being a large weight coefficient for a driving wheel, the reduced pressure judging value after correction is larger than the reduced pressure judging threshold value 0.09 even at high speed, whereby it can be seen that the reduced pressure can be judged with accuracy.

Figure 11:
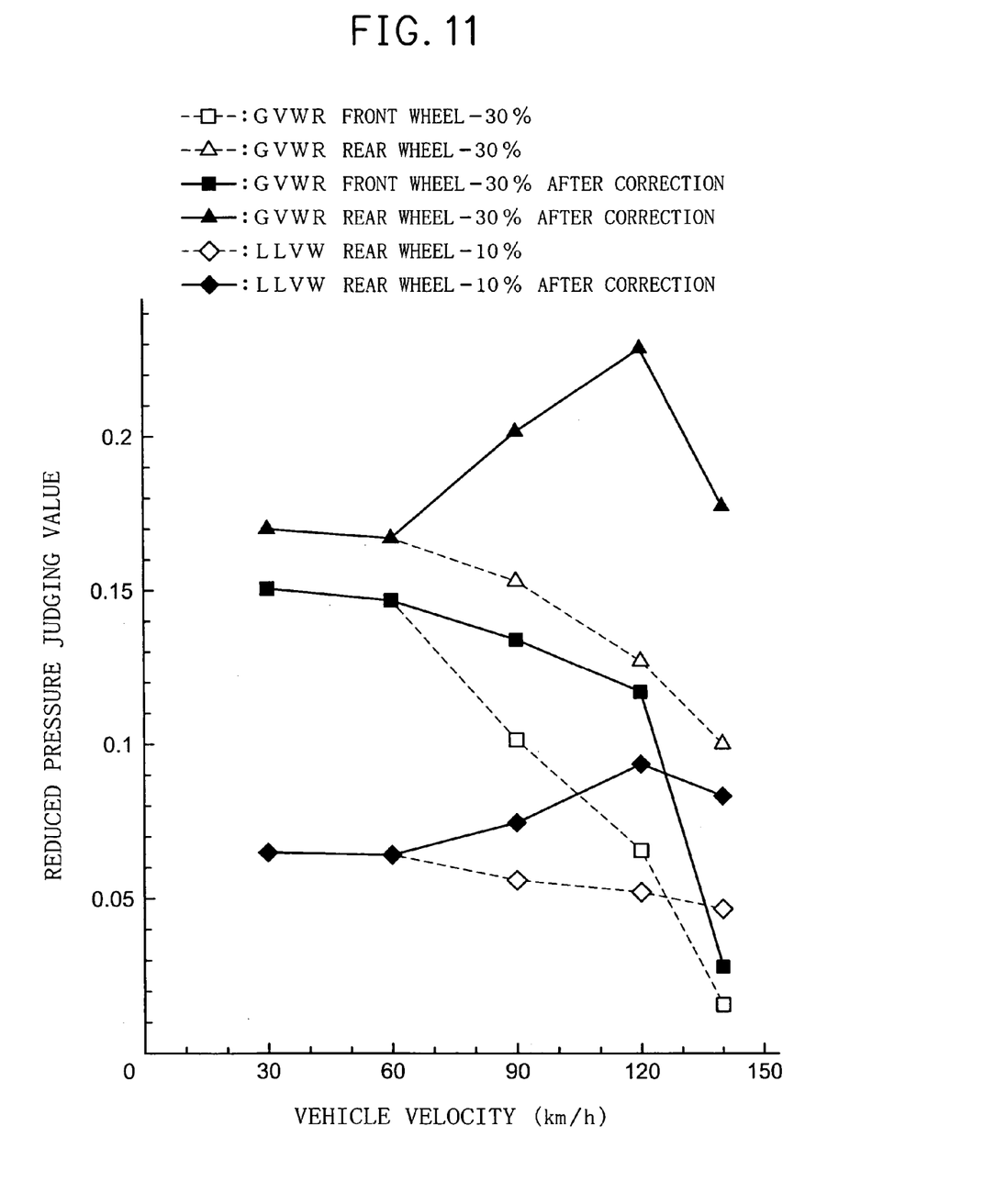
FIG. 11 is a diagram showing a conventional reduced pressure judging value in the case that velocity correction is performed according to a driving wheel, when the driving wheel is being reduced pressure and when a driven wheel is being reduced pressure.

When comparing FIG. 11 with FIG. 4, in the case that the driven wheel (rear wheel) is being reduced pressure by 10% with a vehicle velocity being at high speed and a reduced pressure judging threshold value of a driven wheel being as 0.13, a reduced pressure judging value after correction is close to the reduced pressure judging threshold value at the same weight coefficient as that of a driving wheel in FIG. 11; whereas in FIG. 4, because of being a small weight coefficient for a driven wheel, the reduced pressure judging value after correction has a sufficient difference to the reduced pressure judging threshold value, whereby it can be seen that there may be very little possibility to judge with false that it is being reduced pressure. Further, in the case that the driven wheel (rear wheel) is being reduced pressure by 30%, even a small weight coefficient for a driven wheel of FIG. 4, a DEL value after correction is sufficiently large, whereby the reduced pressure can be responsibly judged.

Consequently, it becomes possible to alarm a reduced pressure state on the driving wheel side even at high speed. Simultaneously, as when traveling at high speed in a state that reduced pressure of the driven wheel is small, a rise in DEL value is suppressed after velocity sensitivity correction in a state that a pneumatic pressure drop should not be alarmed and an erroneous alarm is avoided, whereby accuracy of alarm of the pneumatic pressure drop of the tire can be improved.

Effect of the present invention will be described below with reference to specific examples.

EXAMPLE AND COMPARATIVE EXAMPLE

In this example and comparative example,

Vehicle: BUICK RENDEZVOUS CXL (front-wheel drive);

Tire: Goodyear Fortera P225/60R17; and

Vehicle velocity: in the case of performing reduced pressure alarm within a velocity range up to 112 km/h, were set as conditions.

All the tests were conducted on the throughway I-80 in USA.

Figure 5:
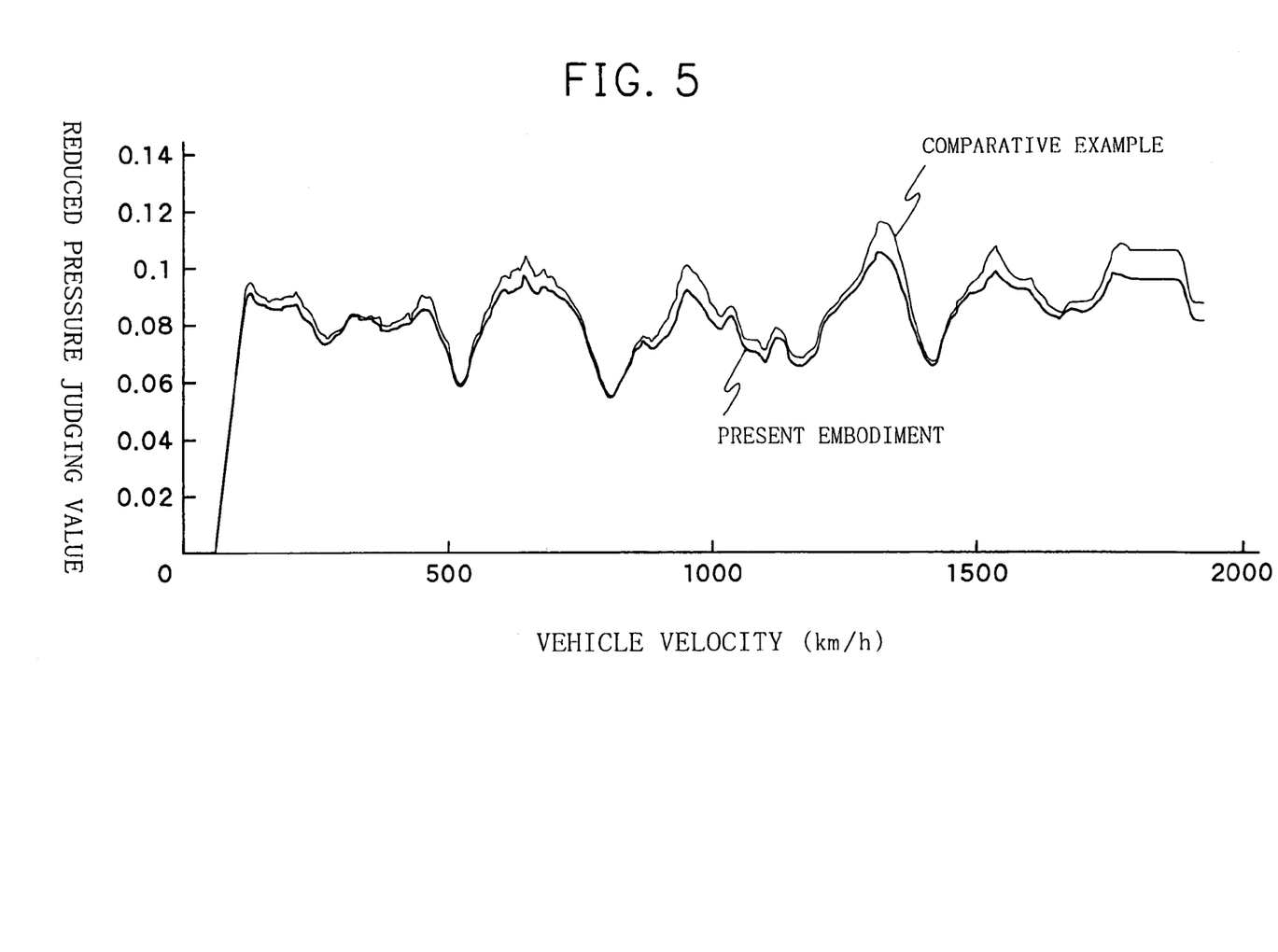
FIG. 5 is a graph showing DEL values after correction according to an example of the present invention and a comparative example in the case of a light load state in which the right rear wheel is being reduced pressure by 10% and at a velocity of approximately 104 km/h.

FIG. 5 is a graph showing DEL value after correction of an example according to the present invention and a comparative example according to a conventional method in the case of a light load state in which the right rear wheel is being reduced pressure by 10% and at a velocity of approximately 104 km/h.

Figure 6:
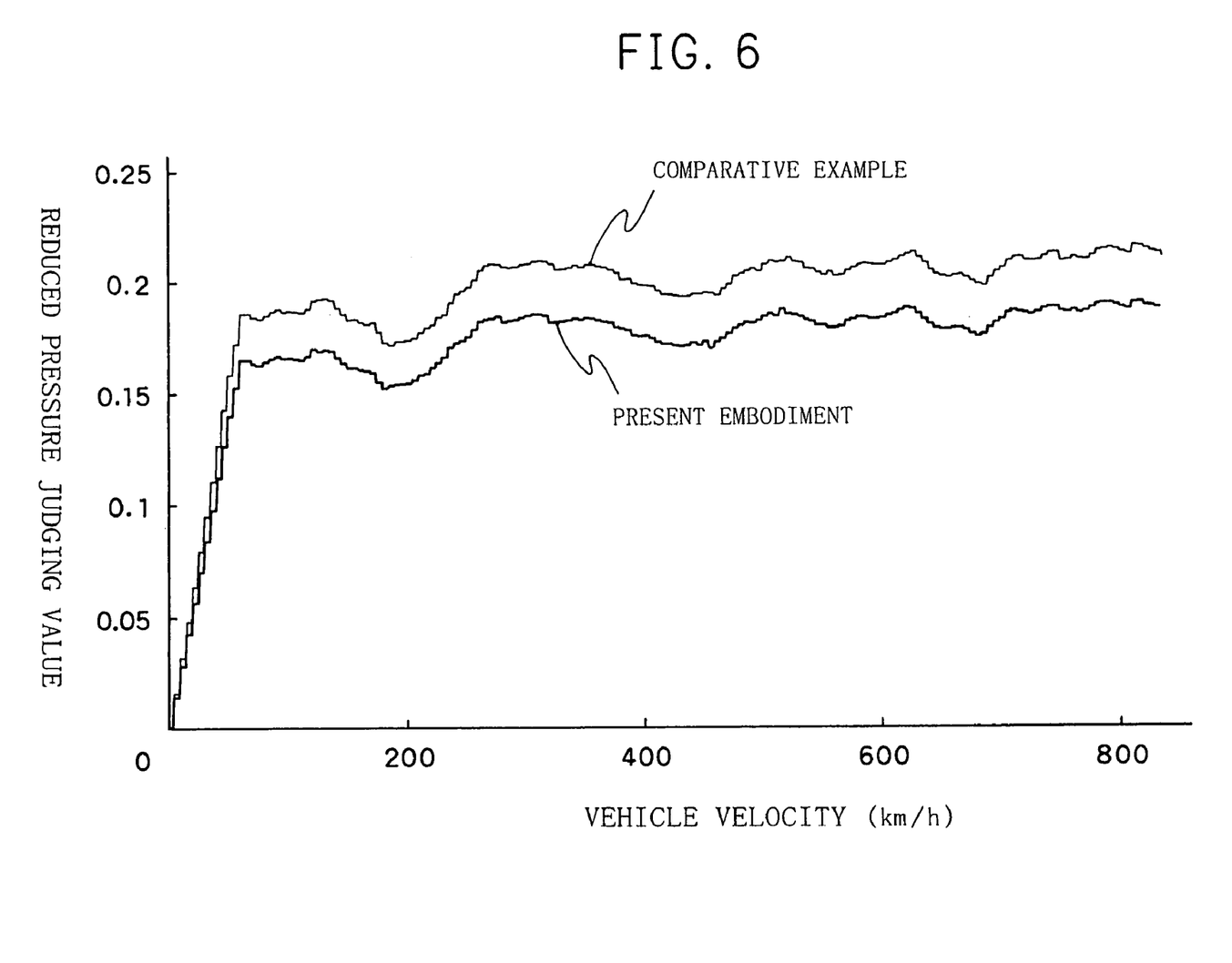
FIG. 6 is a graph showing DEL values after correction according to an example of the present invention and a comparative example in the case of a constant load state in which the right rear wheel is being reduced pressure by 30% and at a velocity of approximately 112 km/h.

FIG. 6 is a graph showing DEL value after correction of an example according to the present invention and a comparative example according to a conventional method in the case of a standard load state in which the right rear wheel is being reduced pressure by 30% and at a velocity of approximately 112 km/h.

Figure 7:
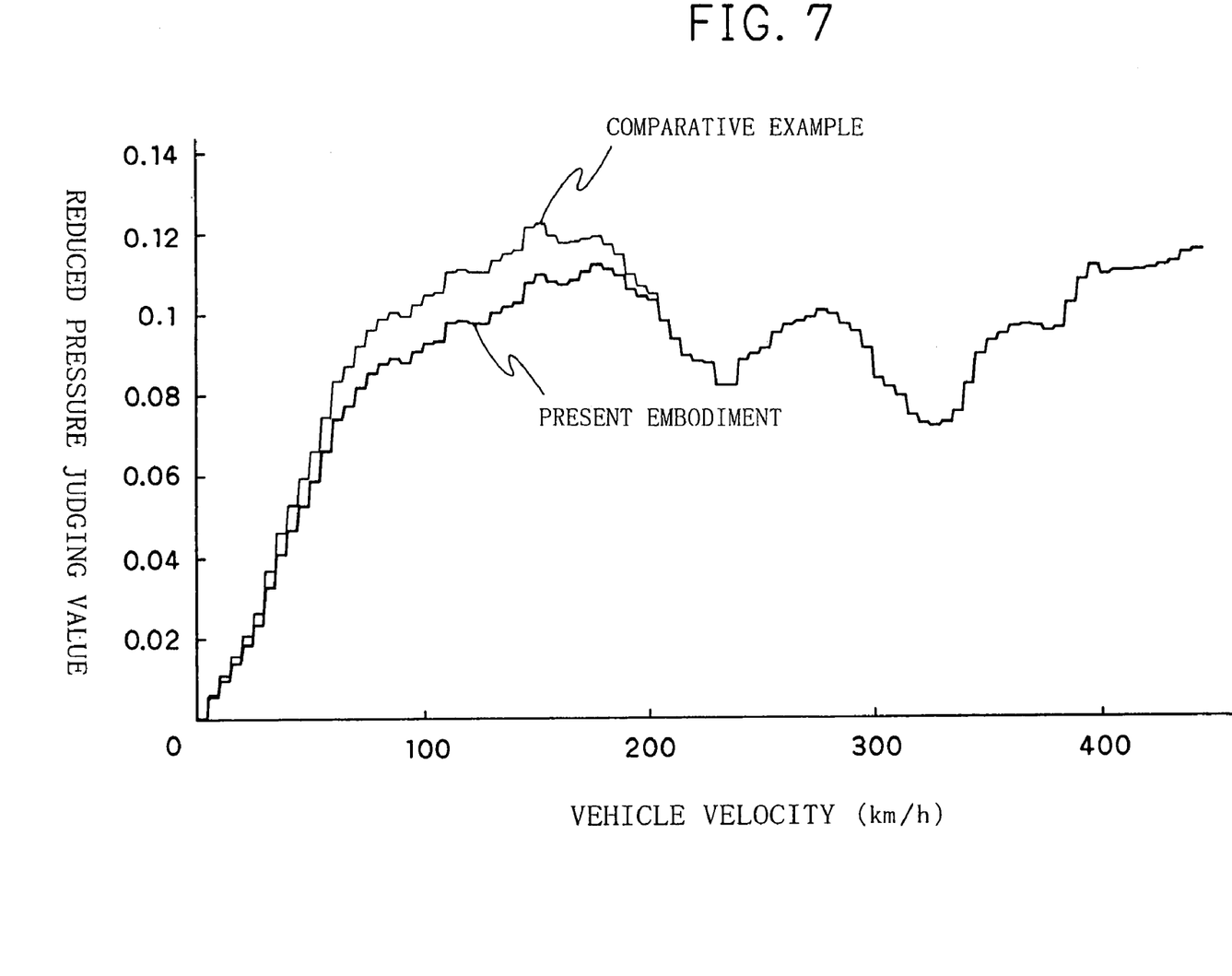
FIG. 7 is a graph showing DEL values after correction according to an example of the present invention and a comparative example in the case of a constant load state in which the left front wheel is being reduced pressure by 30% and at a velocity of approximately 112 km/h.

FIG. 7 is a graph showing DEL value after correction of an example according to the present invention and a comparative example according to a conventional method in the case of a standard load state in which the left front wheel is being reduced pressure by 30% and at a velocity of approximately 112 km/h.

Here, a comparative example according to a conventional method is to perform conventional velocity sensitivity correction which makes no distinction between the driving wheel and the driven wheel. In the comparative example according to the conventional method, a weight coefficient was set as a broken line being similar to FIG. 8; a point to begin converting a weight coefficient was set at RVB0=70 km/h (a weight coefficient=1 at 70 km and below); and a point to reach the maximum weight coefficient was set as the maximum weight coefficient 1.8 at RVB1=115 km/h.

In an example according to a method of the present invention, a weight coefficient was set as broken lines divided into a driving wheel and driven wheel being similar to FIG. 3; each point to begin each converting weight coefficient was set at RVB0=70 km/h (a weight coefficient=1 in both cases of the driving wheel reduced pressure and driven wheel reduced pressure at 70 km and below); and points to reach the respective maximum weight coefficients were set at RVB1=115 km/h, the maximum weight coefficient of the driven wheel was set as 1.6, and the maximum weight coefficient of the driving wheel was set as 1.8.

In the case of FIG. 5, it can be seen that the DEL value (DELAV) after correction of the example is lower than that of the comparative example and probability of erroneous alarm is reduced. When also shown in FIG. 6, the DEL value (DELAV) after correction of the example is lower than that of the comparative example, but values enough to alarm are maintained (an alarming threshold value of the driven wheel is 0.13).

Also in the case of FIG. 7, the DEL value (DELAV) after correction of the example is lower than that of the comparative example in the beginning of measurement. But, after passing 200 seconds, it is tentatively judged by a reduced pressure wheel position tentative judgment logic that the driving wheel is being reduced pressure and then a large weight coefficient for the driving wheel is applied, so that it becomes the DEL value which is enough to alarm and thus alarm can be performed (an alarming threshold value of the driven wheel=0.09). Since a weight coefficient (maximum 1.8) in the case it is judged that the driving wheel according to this example is being reduced pressure is the same as a weight coefficient (maximum 1.8) of the comparative example, the DEL value in the case that the driving wheel is being reduced pressure coincides. The difference in the range between from the beginning of measurement to 200 seconds is produced according to the tentative judgment logic and characteristic of the averaging process.

When compared the example to the comparative example, for example, when it is defined as a reduced pressure state in the case of being reduced pressure by 30%, in the conventional method of the comparative example of FIG. 5, the DEL value (average value DELASV) after velocity sensitivity correction comes close to a normal alarming threshold value of approximately 0.12 regardless of being reduced pressure by 10% at the rear wheel of the driven wheel. Whereas, in the example of the method according to the present invention, the DEL value becomes approximately 0.10 and makes the value lowered, consequently there is no case that it is judged by mistake that a pneumatic pressure of a tire is dropped. Simultaneously, also in the cases of FIG. 6 and FIG. 7, alarm can be performed by maintaining the DEL value which is enough to alarm. Consequently, it becomes possible to alarm in a reduced pressure state of the driving wheel when traveling at high speed, and erroneous error can be avoided.

What is claimed is:
1. A tire deflation warning system, comprising:
   a detecting means for detecting rotational velocities of wheels attached to a vehicle;
   judging means for judging a tire pneumatic pressure drop by
      determining a reduced pressure judging value that judges tire pneumatic pressure drop from a difference between sums of the rotational velocities of two pairs of said wheels which are diagonally disposed in the vehicle,
   determining a corrected reduced pressure judging value by multiplying said reduced pressure judging value by a weight coefficient that continuously varies according to the velocity of the vehicle,
      comparing the corrected reduced pressure judging value with a threshold value to produce a tentative judgement of whether or not there is a reduced pressure wheel; and
      when it is tentatively judged that a reduced pressure wheel is a driving wheel, said reduced pressure judging value is multiplied by said weight coefficient, which is larger than in the case when it is tentatively judged that a reduced pressure wheel is a driven wheel; and
   an indicator for providing an indication of tire pneumatic pressure drop.
2. The tire deflation warning system according to claim 1, wherein the judging means effects further judging of tire pneumatic pressure drop whereby, when it is tentatively judged that said reduced pressure wheel is a driving wheel, the threshold value is smaller than in the case when it is tentatively judged that said reduced pressure wheel is a driven wheel.

3. The tire deflation warning system according to claim 1, and further comprising:
   a computing unit;
   a memory for storing programs and computing data;
   an input device for inputting wheel rotational velocity from the detecting means; and
   an output device for outputting an alarm to the indicator.

4. A tire deflation judging method, comprising the steps of:
   detecting rotational velocities of wheels attached to a vehicle;
   judging a tire pneumatic pressure drop by
      determining a reduced pressure judging value that judges tire pneumatic pressure drop from a difference between sums of the rotational velocities of two pairs of said wheels which are diagonally disposed in the vehicle,
      determining a corrected reduced pressure judging value by multiplying said reduced pressure judging value by a weight coefficient that continuously varies according to the velocity of the vehicle,
      comparing the corrected reduced pressure judging value with a threshold value to produce a tentative judgement of whether or not there is a reduced pressure wheel; and
      when it is tentatively judged that a reduced pressure wheel is a driving wheel, said reduced pressure judging value is multiplied by said weight coefficient, which is larger than in the case when it is tentatively judged that a reduced pressure wheel is a driven wheel; and
   providing an indication of tire pneumatic pressure drop.

5. The tire deflation judging method according to claim 4, and further comprising the step of effecting further judging of tire pneumatic pressure drop whereby, when it is tentatively judged that said reduced pressure wheel is a driving wheel, the threshold value is smaller than in the case when it is tentatively judged that said reduced pressure wheel is a driven wheel.

6. A tire pressure drop judging program provided in a tire deflation warning system, the program, when executed, performing a method comprising the steps of:
   detecting rotational velocities of a wheels attached to a vehicle;
   judging a tire pneumatic pressure drop by
      determining a reduced pressure judging value that judges tire pneumatic pressure drop from a difference between sums of the rotational velocities of two pairs of said wheels which are diagonally disposed in the vehicle,
      determining a corrected reduced pressure judging value by multiplying said reduced pressure judging value by a weight coefficient that continuously varies according to the velocity of the vehicle,
      comparing the corrected reduced pressure judging value with a threshold value to produce a tentative judgement of whether or not there is a reduced pressure wheel; and
      when it is tentatively judged that a reduced pressure wheel is a driving wheel, said reduced pressure judging value is multiplied by said weight coefficient, which is larger than in the case when it is tentatively judged that a reduced pressure wheel is a driven wheel; and
   providing an indication of tire pneumatic pressure drop.

7. The tire pressure drop judging program according to claim 6, wherein the program, when executed, further performs the step of effecting further judging of tire pneumatic pressure drop whereby, when it is tentatively judged that said reduced pressure wheel is a driving wheel, the threshold value is smaller than in the case when it is tentatively judged that said reduced pressure wheel is a driven wheel.

* * * * *